US012681744B1

(12) United States Patent
Kumar et al.

(10) Patent No.: US 12,681,744 B1
(45) Date of Patent: Jul. 14, 2026

(54) IMMUTABLE RESOURCE RETENTION RULES FOR RESOURCE RECOVERY SERVICE

(71) Applicant: Amazon Technologies, Inc., Seattle, WA (US)

(72) Inventors: Sandeep Kumar, Sammamish, WA (US); Venkatesh Nagapudi, San Jose, CA (US); Ankit Singh, Sammamish, WA (US); Shengjie Quan, Bellevue, WA (US); Edwin Ma, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 958 days.

(21) Appl. No.: 17/937,027

(22) Filed: Sep. 30, 2022

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01); *G06F 2009/45595* (2013.01)

(58) Field of Classification Search
CPC ................................................... G06F 9/4887
See application file for complete search history.

(56) References Cited

U.S. PATENT DOCUMENTS

| | | | |
|---|---|---|---|
| 10,198,327 B1 * | 2/2019 | Gopinath | G06F 11/1469 |
| 11,341,245 B1 * | 5/2022 | Voss | G06F 11/2094 |
| 2023/0090799 A1 * | 3/2023 | Baez | G06F 16/125 |
| | | | 707/821 |

* cited by examiner

*Primary Examiner* — Andy Ho

(74) *Attorney, Agent, or Firm* — Knobbe, Martens, Olson & Bear, LLP

(57) ABSTRACT

Provided is a system for facilitating recovery of deleted computing resources in a cloud network environment. A centralized resource recovery service may communicate with a plurality of resource management services that are each configured to create, modify, or delete their respective computing resources such as storage volumes, databases, and compute instances. The resource recovery service may allow creation of immutable resource retention rules that are, under certain conditions, unable to be deleted or modified, even by an administrative user who created such retention rules. Such immutable retention rules may be used to thwart malicious attempts to permanently delete resources by deleting the retention rules that govern such resources. Since such attempts to delete such immutable retention rules would fail, the retention rules would continue to apply and allow deleted resources to be placed in a recoverable state according to the retention rules.

20 Claims, 7 Drawing Sheets

Figure 4:
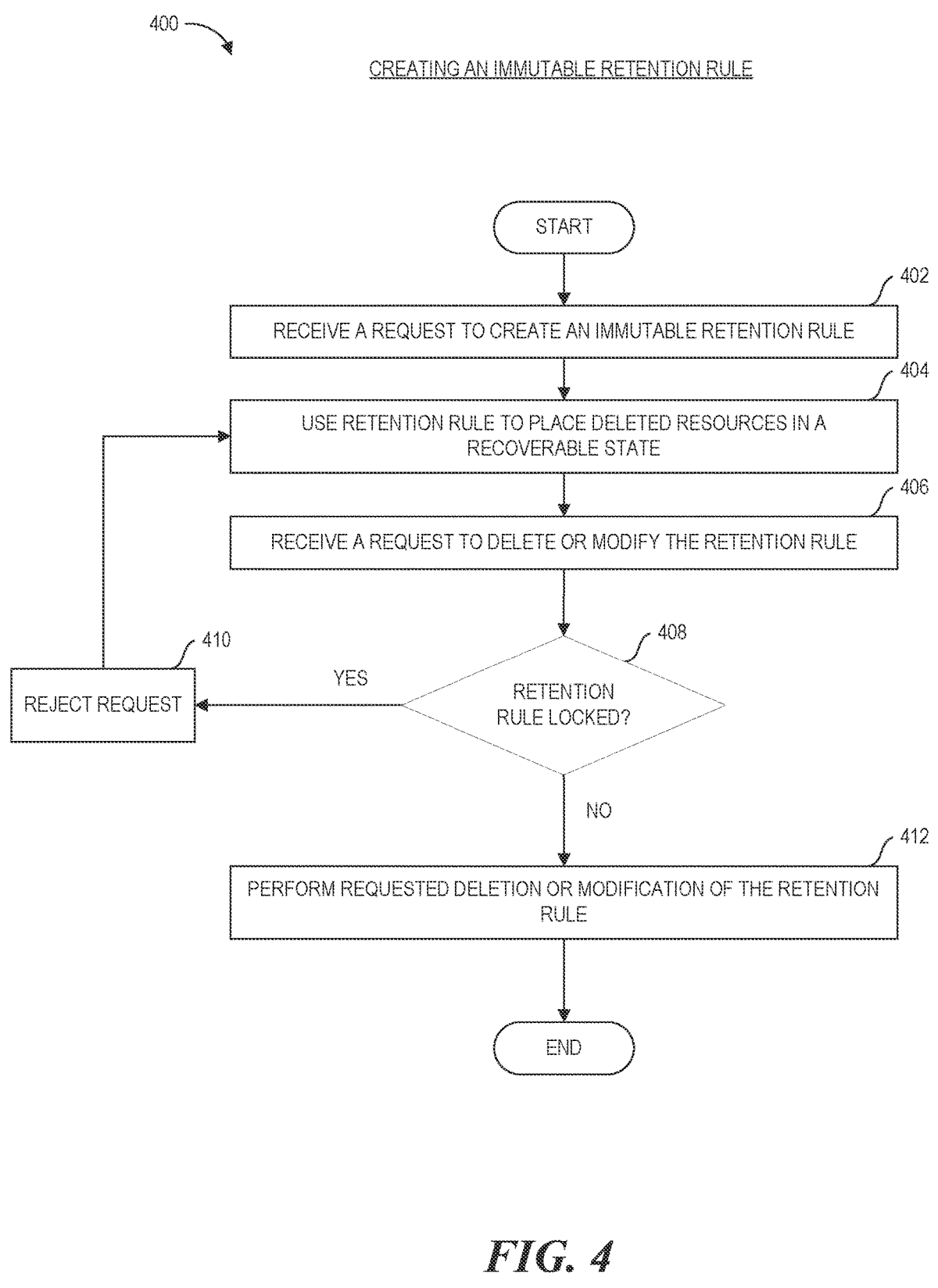

400

CREATING AN IMMUTABLE RETENTION RULE

START

RECEIVE A REQUEST TO CREATE AN IMMUTABLE RETENTION RULE — 402

USE RETENTION RULE TO PLACE DELETED RESOURCES IN A RECOVERABLE STATE — 404

RECEIVE A REQUEST TO DELETE OR MODIFY THE RETENTION RULE — 406

RETENTION RULE LOCKED? — 408

REJECT REQUEST — 410

YES

NO

PERFORM REQUESTED DELETION OR MODIFICATION OF THE RETENTION RULE — 412

END

DISABLING IMMUTABILITY OF A RETENTION RULE

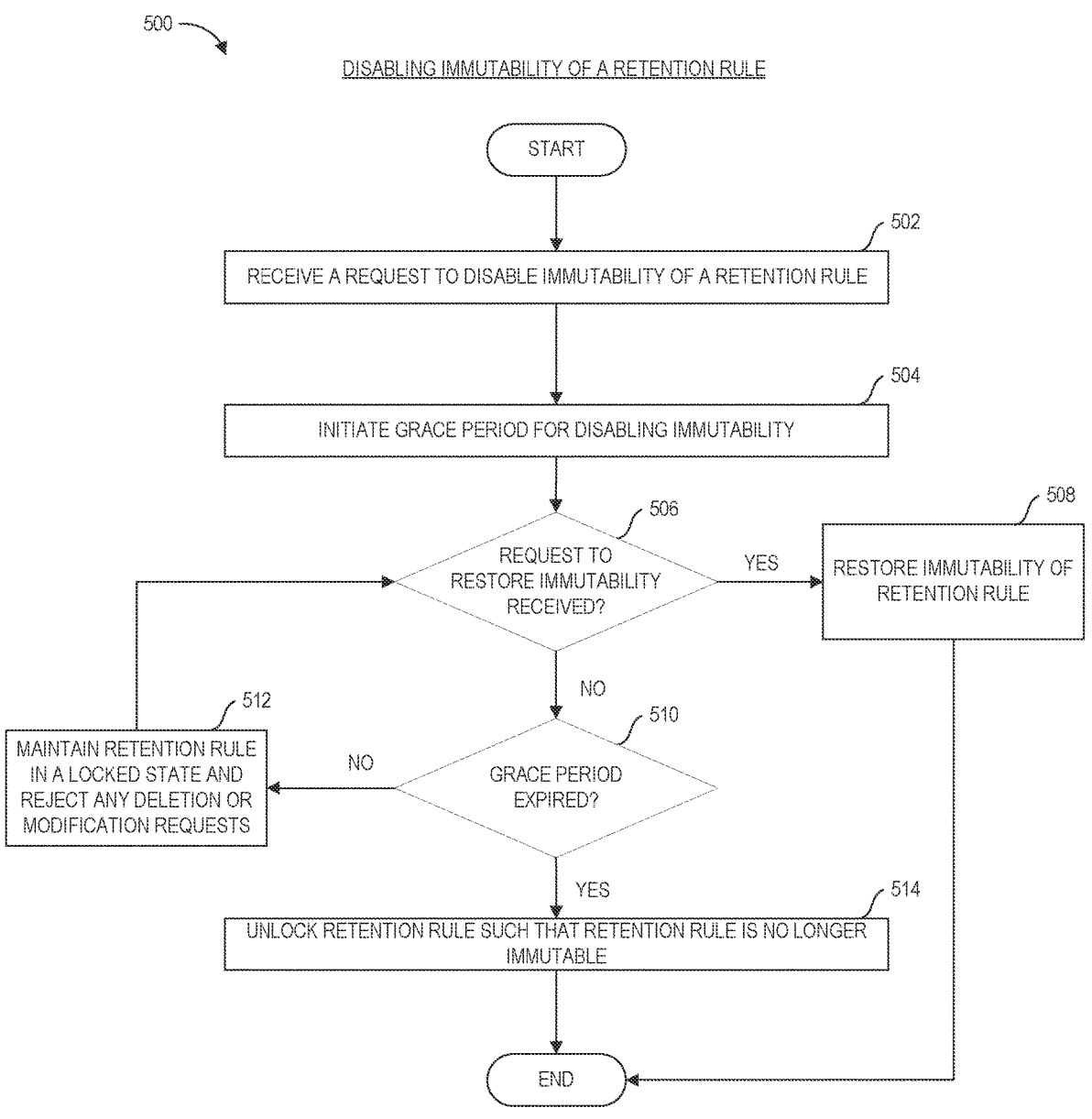

START

502 — RECEIVE A REQUEST TO DISABLE IMMUTABILITY OF A RETENTION RULE

504 — INITIATE GRACE PERIOD FOR DISABLING IMMUTABILITY

506 — REQUEST TO RESTORE IMMUTABILITY RECEIVED?

YES → 508 — RESTORE IMMUTABILITY OF RETENTION RULE

NO

510 — GRACE PERIOD EXPIRED?

NO → 512 — MAINTAIN RETENTION RULE IN A LOCKED STATE AND REJECT ANY DELETION OR MODIFICATION REQUESTS

YES

514 — UNLOCK RETENTION RULE SUCH THAT RETENTION RULE IS NO LONGER IMMUTABLE

END

DELETING A RETENTION RULE

START

602

RECEIVE A REQUEST TO DELETE A RETENTION RULE

606

REJECT DELETION REQUEST

604

YES

RETENTION RULE IN A LOCKED STATE?

NO

608

INITIATE GRACE PERIOD FOR DELETING A RETENTION RULE

610

REQUEST TO RESTORE RETENTION RULE RECEIVED?

YES

612

RESTORE RETENTION RULE

NO

616

CONTINUE TO APPLY RETENTION RULE

NO

614

GRACE PERIOD EXPIRED?

YES

618

DELETE RETENTION RULE

END

IMMUTABLE RESOURCE RETENTION RULES FOR RESOURCE RECOVERY SERVICE

BACKGROUND

Modern computer systems are frequently implemented as distributed collections of computer systems operating collectively within one or more host computer system environments. Such a host computer environment may deploy computing resources across multiple servers or virtual machines and manage the computing resources on behalf of customers.

BRIEF DESCRIPTION OF THE DRAWINGS

FIG. 4 is a flowchart of an example process for creating an immutable retention rule in accordance with aspects of the present disclosure.

FIG. 5 is a flowchart of an example process for disabling the immutability of a retention rule in accordance with aspects of the present disclosure.

DETAILED DESCRIPTION

Introduction

Figure 1:
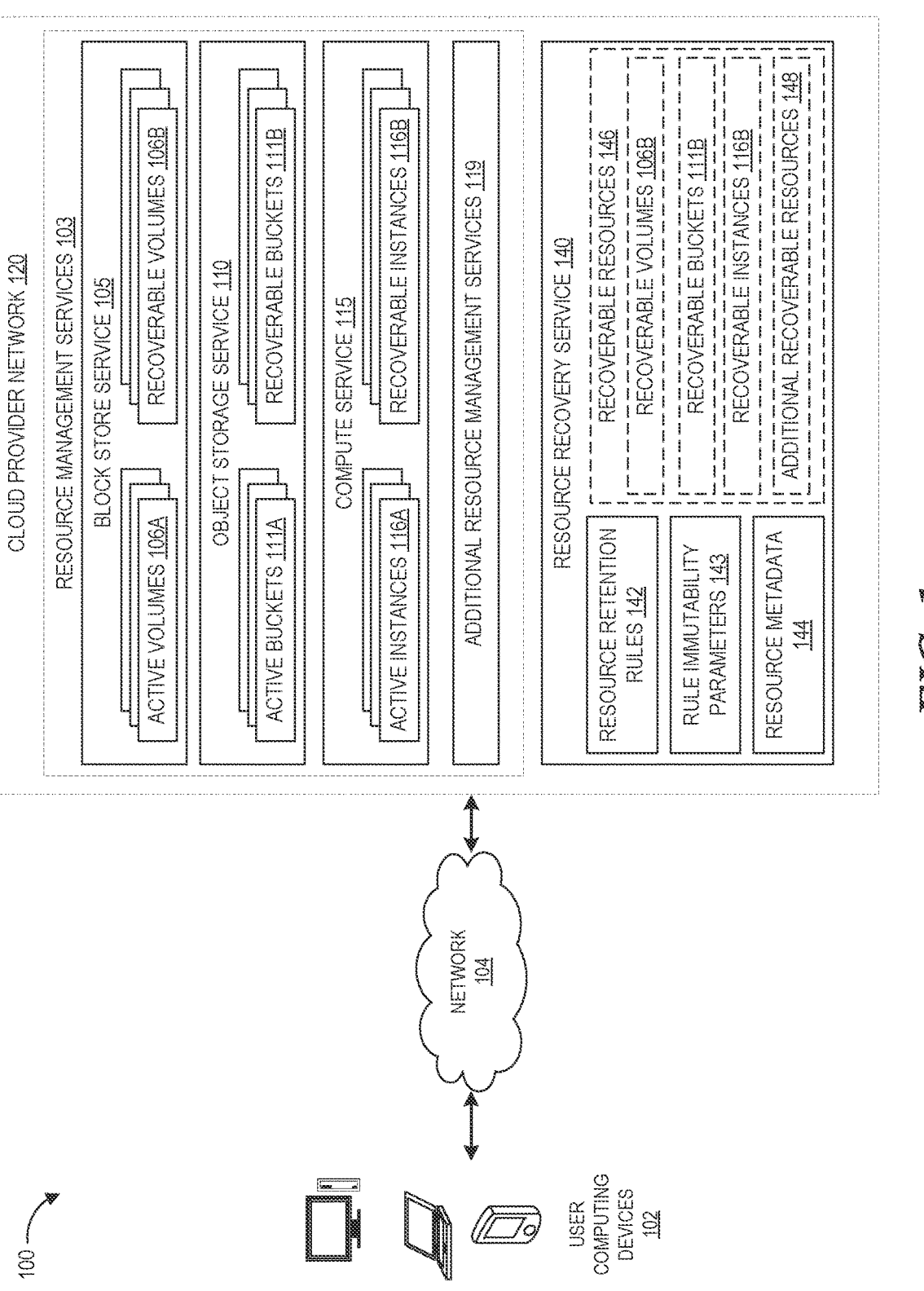
FIG. 1 depicts a schematic diagram of a network environment in which a cloud provider network is used to implement a resource recovery service in accordance with aspects of the present disclosure.

The present disclosure relates to techniques for facilitating recovery of deleted computing resources in a cloud network environment. Existing recovery bin solutions may allow recovery of accidentally deleted resources by configuring retention rules that allow such computing resources to be placed in a recoverable state upon deletion. However, a malicious user who gains access admin privileges may delete the applicable retention rules before deleting the resources so that the deleted resources are deleted permanently without being placed in a recoverable state. In such a case, the deleted resources may not be recoverable. Upon learning about the malicious deletion, the owner of the resources could open a support ticket with the cloud service provider, and in response, a service team of the cloud service provider may try to recover the deleted resource on the backend. However, such a process can be very cumbersome and time-consuming, and there is no guarantee that the resource would be successfully recovered.

These aforementioned challenges, among others, are addressed in some embodiments by the disclosed techniques for configuring immutable resource retention rules. These techniques implement immutable resource retention rules that are unable to be deleted or modified by an unauthorized user, thereby reducing the risk of malicious permanent deletions.

As will be appreciated by one of skill in the art in light of the present disclosure, the embodiments disclosed herein improve the ability of computing systems and systems that manage computing resources, such as data storage systems and compute systems, to provide mechanisms for recovering and restoring resources that were previously deleted or otherwise made unavailable. Further, by configuring immutability into the resource retention rules, the cloud provider network of the present disclosure can improve security and address the deficiencies described above.

Prior techniques for allowing a user to recover inadvertently or maliciously deleted resources generally relied on setting up resource retention rules that allowed certain resources triggering such rules to be placed in a recoverable state upon deletion. However, such approaches can allow malicious actors to delete or modify the retention rules such that the resources no longer trigger the retention rules and thus become deleted permanently without being placed in a recoverable state.

In contrast, embodiments of the present disclosure enable immutable resource retention rules that allow the underlying resources to be protected from malicious users who gain admin privileges to create, modify, and/or delete resource retention rules, thereby reducing the risk of malicious permanent deletions and providing improved data security, especially in a network that involves many different types of resources and users.

The presently disclosed embodiments therefore address technical problems inherent within computing systems, such as facilitating resource management and resource recovery as well as improving security. These technical problems are addressed by the various technical solutions described herein, including the provision of a resource recovery service and immutable resource retention rules. Thus, the present disclosure represents an improvement on existing resource storage and management systems, and computing systems in general.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Overview of Example Computing Environment for Resource Recovery Service

FIG. 1 depicts an example computing environment 100 including a cloud provider network 120 in which the disclosed resource recovery service can be implemented. A cloud provider network (sometimes referred to as a cloud provider system or simply a "cloud") refers to a large pool of network-accessible computing resources (such as compute, storage, and networking resources, applications, and services), which may be virtualized (e.g., virtual machines) or bare-metal (e.g., bare-metal instances or physical machines). The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and/or the hardware and software in cloud provider data centers that provide those services. It will be appreciated that the disclosed techniques for facilitating resource recovery may be implemented in non-elastic computing environments as well.

The cloud provider network 120 can be accessed by user computing devices 102 over a network 104. The cloud provider network 120 may include resource management services 103, which include block store service 105, object storage service 110, compute service 115, and additional resource management services 119. The cloud provider network 120 may also include a resource recovery service 140, which includes resource retention rules 142 (also referred to herein as resource recovery rules, resource recovery conditions, or resource retention conditions), rule immutability parameters 143 (which may include any of the parameters described herein such as locking period, mode, grace period, locking start delay, and the like), resource metadata 144, and recoverable resources 146 (also referred to herein as recovery bin, which can be interchangeable with recycle bin, temporary storage bin, etc. in some cases), which include the recoverable resources 106B, 111B, and 116B from the resource management services 103 and additional recoverable resources 148. The components of the cloud provider network 120 are in networked communication with one another and with the network 104 to provide users with on-demand access to the services and resources provided by the cloud provider network 120.

The resource recovery service 140 provides the resource retention rules 142, which are usable by the resource recovery service 140 to determine which, if any, resource retention rule or condition applies to the delete request received from the resource management service, and the resource metadata 144, which are usable by the resource recovery service 140 to determine whether and when a resource retained in the recovery bin should be evicted, and whether eviction has been suspended. As discussed herein, a resource retention rule can be made immutable such that the rule cannot be deleted or modified once it is created, for a locking period specified when the rule is created. For example, if an administrator created an immutable, account-level retention rule for snapshots with a retention period of 7 days and a locking period of 1 year, this rule cannot be deleted or modified for one year following its creation. In this example, for the one year following the immutable rule creation, no user will be able to change the retention so that all snapshots in the account will be retained for 7 days upon deletion. In some implementations, resources are not able to be permanently deleted once they are sent to the recycle bin. In other implementations, if a resource is deleted and sent to the recycle bin by an immutable retention rule having a locked period, this resource cannot be permanently deleted until the retention period has expired.

The term "eviction" may refer to permanently deleting a resource that was previously placed in a recovery bin or previously placed in a recoverable state. The resource retention rules 142 may indicate which tags (or other information such as keyword, etc.) are associated with which recovery policy (e.g., whether to place in recycle bin, how long the resource should be retained in the recovery bin before automatic permanent deletion, whether manual, user-requested eviction is allowed, whether eviction has been suspended (for all resources, or for resources deleted before, during, or after a specific time period), etc.), and the resource metadata 144 of a resource may indicate tags (or other information such as keyword, etc.) that can be used to determine whether the resource satisfies any of the resource retention rules 142. In some embodiments, the resource retention rules 142 may be added, modified, or deleted by any user having access to the underlying resources that would be governed by such rules. In other embodiments, a user (or a set of users) that is different from the user(s) having access to the underlying resources is authorized to add, modify, or delete the resource retention rules 142. In some embodiments, there is an overlap in the set of users authorized to access the underlying resources and the set of users authorized to modify the resource retention rules 142. In other embodiments, there is no overlap in the set of users authorized to access the underlying resources and the set of users authorized to modify the resource retention rules 142. The techniques for configuring and managing immutable resource retention rules are described in greater detail below with reference to FIGS. 2-6.

The resource recovery service 140 may provide a set of application programming interfaces ("APIs") that can be used by the users of the user computing devices 102 to create, modify, and delete resource retention rules, and the like. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

For example, the resource recovery service 140 may provide a create rule API that allow the user to specify one or more of the following parameters:

(1) Locking period, which is the period of time (e.g., specified in days) for which the created rule is to be immutable (e.g., unable to be deleted or modified). In some embodiments, in the event that a locking period is not specified or included in the request to create the retention rule, the retention rule does not become immutable (e.g., users are allowed to modify or delete the rule without restrictions). In other embodiments, in the event that a locking period is not specified or included in the request to create the retention rule, the retention rule becomes immutable by default. In some embodiments, locking period is not used and the rule is locked perpetually until unlock is requested or initiated.

(2) Mode: compliance or governance. If the retention rule is in compliance mode, all requests to delete or modify the retention rule after the rule has been created may be rejected. If the retention rule is in governance mode, the request to delete or modify the rule may require an override permission to be completed. If a mode is not specified, the rule is created in governance mode. In another embodiment, if a mode is not specified, the rule is created in compliance mode. The compliance mode may be used for a retention rule if no user or role is intended to modify or delete the retention rule after the rule is created and locked down for the period of time specified by the locking period. The governance mode may be used for a retention rule a subset of the roles or users allowed to delete or modify the rule are to be allowed to delete or modify the rule after the rule is created and locked down.

(3) Locking start delay: This may be the period of time (e.g., specified in days) after which the locking period will start for this rule, after the rule is created. This is a "cooling period" in case the user creating the rule may want to further modify the rule before the rule is locked. In some embodiments, by default, the locking start delay is set to 1 day, which can also coincide with the minimum time period the user is allowed to specify. In other embodiments, configurability for the locking start delay is not provided, and the locking start delay is set to 1 day. An admin or account owner with permissions to create or update retention rules (e.g., by calling the corresponding APIs) may be able to use the locking start delay parameter to modify the rule or delete the rule within the locking start delay time period after successful execution of the API calls to create/modify the rule. The admins or owners may also be able to use the locking start delay time period to validate that they have set up the right permissions for the rule. During this period, the admins or owners can validate that no other user is able to modify or delete the rule. In some embodiments, locking start delay is not used and the rule is locked immediately upon creation.

(4) Grace period for unlocking an immutable retention rule: This may be the period of time (e.g., specified in days) after which any request to unlock an immutable retention rule can be granted. For example, if an immutable retention rule is created with a 30-day grace period for unlocking the rule, once a user with valid credentials submits a request to unlock the rule, the rule may be unlocked after 30 days from the moment the request is submitted. Unless and until the rule has been unlocked, the rule may remain undeletable and/or unmodifiable such that any request to delete and/or modify the rule may be rejected.

For an existing retention rule, the update rule API can be used with the locking period, mode, locking start delay, grace period parameters to convert an existing rule into an immutable rule. Similarly, an existing immutable rule can be converted into a non-immutable (modifiable or deletable) rule.

Although not shown in FIG. 1, some implementations of cloud provider network 120 can additionally include domain name services ("DNS") servers, relational database servers, and other server configurations (not illustrated) for supporting on-demand cloud computing system Each server includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can provide on-demand, scalable computing system to users through the network 104, for example allowing users to have at their disposal scalable "virtual computing devices" via their use of the block store service 105, object storage service 110, and compute service 115. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be provided across a number of geographically separate regions, for example to provide users with lower latencies by having their virtual computing devices in or near their geographic location. Each region is physically isolated from and independent of every other region in terms of location and power supply, and may communicate data with the other regions through the network 104. Each region can include two or more availability zones each backed by one or more physical data centers provided with redundant and separate power, networking and connectivity to reduce the likelihood of two zones failing simultaneously. While a single availability zone can span multiple data centers, no two availability zones share a data center. This can protect users from data-center level failures. A data center refers to a physical building or enclosure that houses and provides power and cooling to one or more of the block store service 105, object storage service 110, and compute service 115. The data centers within an availability zone and the availability zones within a region are connected to one another through private, low-latency links, for example fiber optic network cables. This compartmentalization and geographic distribution of computing hardware enables the cloud provider network 120 to provide fast service to users on a global scale with a high degree of fault tolerance and stability. To distribute resources evenly across the zones in a given region, the provider of the cloud provider network 120 may independently map availability zones to identifiers for each user account.

Turning specifically to the roles of the different servers within the cloud provider network 120, the compute service 115 include one or more servers on which provide resizable computing capacity to users for building and hosting their software systems. Users can use the compute service 115 to launch as many virtual computing environments, referred to as "instances" 116, as they need. Instances 116 can have various configurations of processing power, memory, storage, and networking capacity depending upon user needs. As shown in FIG. 1, the instances 116 may include active instances 116A (e.g., instances that are accessible by their users and have not been deleted) and recoverable instances 116B (e.g., instances that have been deleted and placed in the recovery bin). The compute service 115 can also include computer storage for temporary data used while an instance is running, however as soon as the instance is shut down this data is lost.

The block store service 105 provide persistent data storage for the compute service 115 in the form of volumes 106. As shown in FIG. 1, the volumes 106 may include active volumes 106A (e.g., volumes that are accessible by their users and have not been deleted) and recoverable volumes 106B (e.g., volumes that have been deleted and placed in the recovery bin). The block store service 105 include one or more servers on which data is stored as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 kB, 8 kB, 16 kB, 32 kB, 64 kB, 128 KB, 256 kB, 512 KB, or larger, depending upon the implementation. The snapshots described herein may include any number of such blocks. The size of a snapshot may vary, depending for example upon the size of the user volume for which the snapshot is created.

User volumes 106, which can be treated as an individual hard drive ranging for example from 1 GB to 1 terabyte TB (or more) in size, are made of one or more blocks stored on the block store service 105. Although treated as an individual hard drive, it will be appreciated that a volume may be stored as one or more virtualized devices implemented on one or more underlying physical host devices. Volumes 106 may be partitioned a small number of times (e.g., up to 16) with each partition hosted by a device of the cloud provider network 120 that has the ability to transfer data at around 1 GB per second ("Gbps") in some implementations. These volumes provided persistent, dedicated storage that can be attached to particular instances of the compute service 115. Each volume may be attached to a single instance running on a compute server 115, and can be detached from that instance and re-attached to another. The block store service 105 may have built-in redundancy for volumes by replicating the volume across multiple servers within an availability zone, which means that volumes will not fail if an individual drive fails or some other single failure occurs.

The object storage service 110 represent another type of storage within the cloud provider network 120. The object storage service 110 include one or more servers on which data is stored as objects within resources referred to as buckets 111. As shown in FIG. 1, the buckets 111 may include active buckets 111A (e.g., buckets that are accessible by their users and have not been deleted) and recoverable buckets 111B (e.g., buckets that have been deleted and placed in the recovery bin). Each object typically includes the data being stored, a variable amount of metadata that enables various capabilities for the object storage service 110 with respect to analyzing a stored object, and a globally unique identifier or key that can be used to retrieve the object. Objects stored on the object storage service 110 are associated with a unique identifier, such that authorized access to them can be obtained through requests from networked computing devices in any location. Each bucket 111 is associated with a given user account. Users can store as many objects as desired within their buckets, can write, read, and delete objects in their buckets, and can control access to their buckets and the objects contained therein. Further, in embodiments having a number of different object storage service 110 distributed across different ones of the regions described above, users can choose the region (or regions) where a bucket is stored, for example to optimize for latency. Users can use object storage service 110 for purposes such as storing photos on social media websites, songs on music streaming websites, or files in online collaboration services, to name a few examples. Applications developed in the cloud often take advantage of the vast scalability and metadata characteristics of the object storage service 110. The object storage service 110 can support highly parallel data accesses and transfers.

The object storage service 110 can offer even greater redundancy than the block store service 105, as the object storage service 110 can automatically replicate data into multiple availability zones. The object storage service 110 also have different data throughput than the block store service 105, for example around 20 Mbps for a single stream of data. While the object storage service 110 can be used independently from the instances 116 and volumes 106 described above, they can also be used to provide data backup as described herein with respect to snapshots (e.g., object-stored backups of volume data).

The traffic and operations of the cloud provider network 120 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information, etc.). The data plane includes customer resources that are implemented on the cloud provider network (e.g., computing instances, containers, block storage volumes, databases, file storage, etc.). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

The cloud provider network 120 can be formed as a number of regions, where a region is a separate geographical area in which the cloud provider clusters data centers. Each region can include two or more availability zones connected to one another via a private high speed network, for example, a fiber communication connection. An availability zone (also known as an availability domain, or simply a "zone" or an "AZ") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the cloud provider network to provide low latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 120 can provide on-demand, scalable computing system to users through the network 104, for example, allowing users to have at their disposal scalable physical and/or virtual computing devices via their use of the instances illustrated in FIG. 1. These virtual computing devices have attributes of a personal computing device including hardware (various types of processors, local memory, random access memory ("RAM"), hard-disk and/ or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. The user computing devices 102 can include any network-equipped computing device, for example, desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

The cloud provider network 120 may implement various computing resources or services (some of which may not be illustrated in FIG. 1), which may include a compute service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), a Kubernetes-based container orchestration and management service (referred to in various implementations as a container service for Kubernetes, Azure Kubernetes service, IBM cloud Kubernetes service, Kubernetes engine, or container engine for Kubernetes), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider network 120, in contrast to resources requested by users of the cloud provider network 120, which may be provisioned in user accounts. The disclosed techniques for facilitating resource recovery can be implemented as part of a virtual compute service, container service, or Kubernetes-based container service in some embodiments.

In some embodiments, the execution of compute instances is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as micro VMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

Although some embodiments of the present disclosure describe an instance as being a virtual machine, an instance, as used herein, may refer to any one of a virtual machine instance, a bare-metal instance, a microVM, a physical machine, a container, a node, an offload card, or another unit of compute capacity configurable to execute user code. Such an instance may reside within the cloud provider network 120 or within an on-premises environment outside the cloud provider network 120.

Example Retention Rule Deletion Workflow

Figure 2:
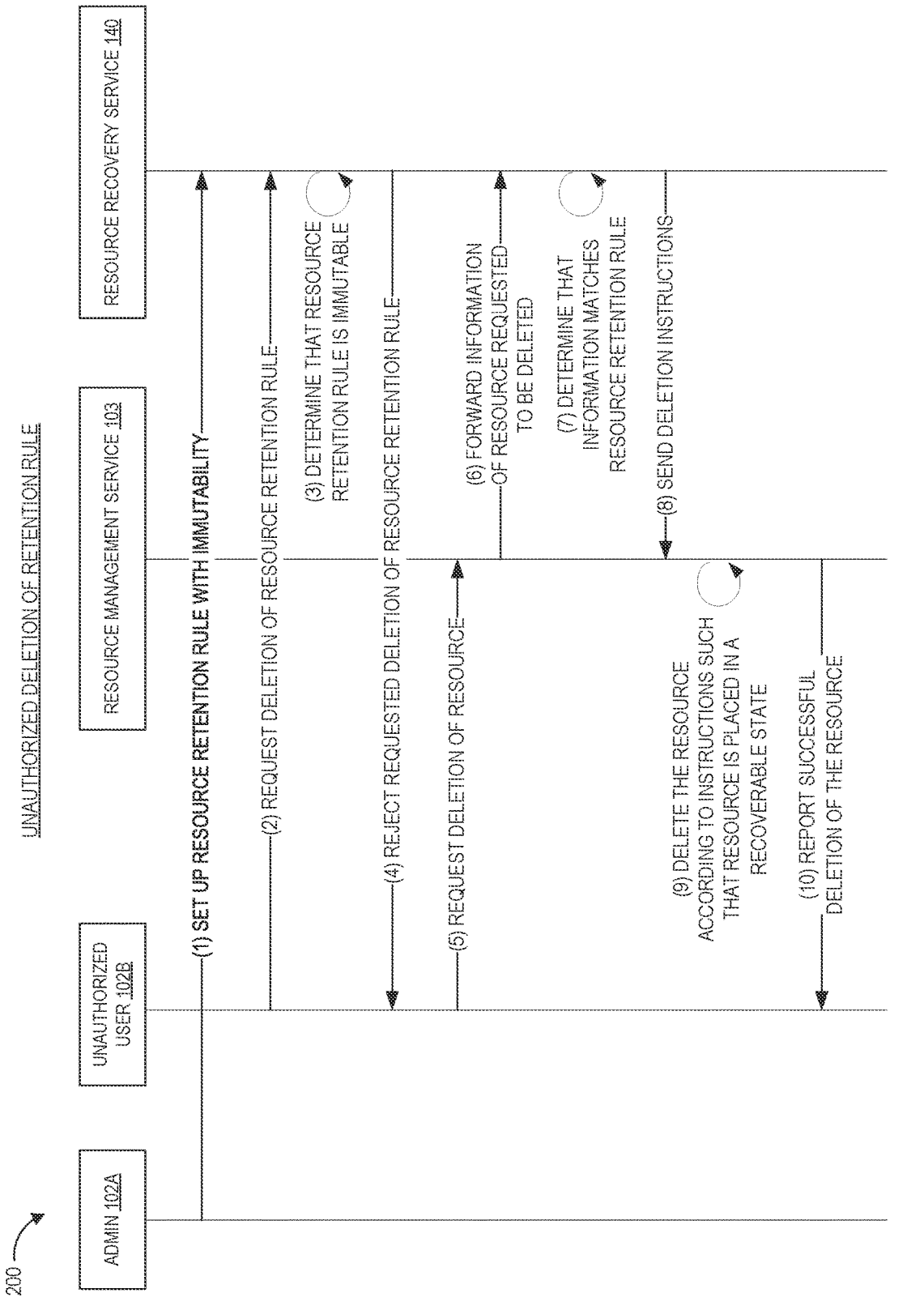
FIG. 2 depicts a workflow diagram an example process involving an unauthorized attempt at deleting a resource retention rule in accordance with aspects of the present disclosure.

FIG. 2 depicts a workflow diagram of an example process involving an unauthorized attempt to delete a resource retention rule in accordance with aspects of the present disclosure. As shown in FIG. 2, at (1), an admin 102A sets up a resource recovery rule with immutability with the resource recovery service 140. In some embodiments, the resource recovery rule is created with a perpetual lock such that the resource recovery rule remains locked (or immutable) until unlocked (or immutability is removed). In other embodiments, the resource recovery rule is created without immutability unless locking (e.g., indicating that the resource recovery rule should be locked) or locking period (e.g., indicating a duration for which the resource recovery rule should be locked) is specified. At (2), an unauthorized user 102B (e.g., someone who has gained the credentials or privileges of the admin 102A) requests deletion of the resource retention rule previously set up by the admin 102A. Although described as an "unauthorized" user, the user 102B may in fact have valid credentials (e.g., those associated with the admin 102A) and may be authorized to create, modify, and/or delete retention rules. In some embodiments, the admin 102A and the unauthorized user 102B are the same user and/or initiate the one or more steps described herein from the same user computing device. In other embodiments, the admin 102A and the unauthorized user 102B are two different users and/or initiate the one or more steps described herein from two different user computing devices. At (3), in response, the resource recovery service 140 determines that the resource retention rule is immutable, and at (4), rejects the requested deletion of the resource retention rule. At (5), the unauthorized user 102B requests deletion of a resource managed by a resource management service 103. At (6), in response, the resource management service 103 forwards information associated with the resource that has been requested to be deleted, to the resource recovery service 140. At (7), in response, the resource recovery service 140 determines that the information matches the resource retention rule (e.g., the resource satisfies the condition specified by the resource retention rule), and at (8), sends deletion instructions to the resource management service 103. At (9), in response, the resource management service 103 deletes the resource according to the instructions such that the resource is placed in a recoverable state, and at (10), reports to the unauthorized user 102B that the resource has been successfully deleted.

Example Retention Rule Immutability Removal Workflow

Figure 3:
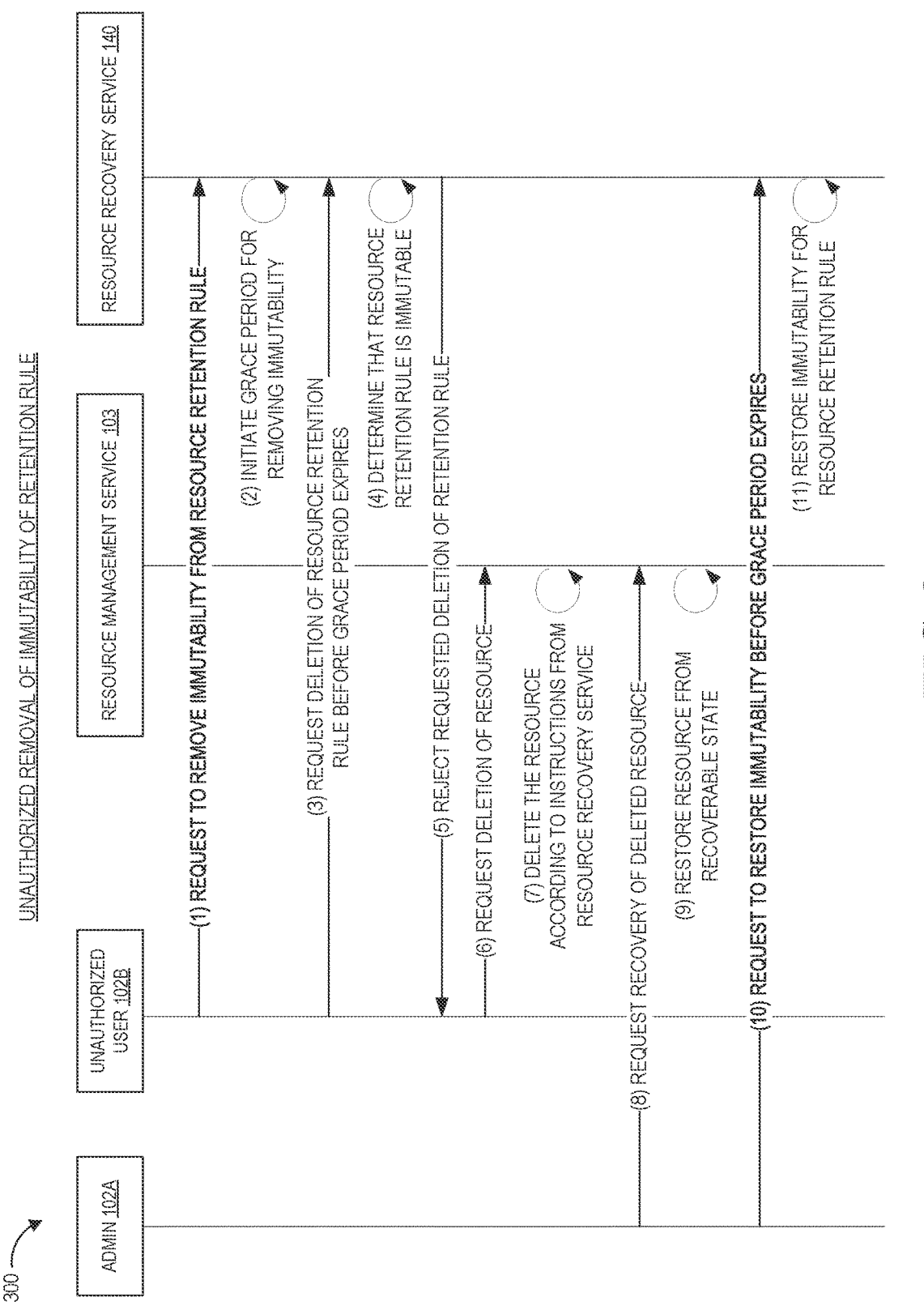
FIG. 3 depicts a workflow diagram an example process involving an unauthorized attempt at removing the immutability of a resource retention rule in accordance with aspects of the present disclosure.

FIG. 3 depicts a workflow diagram of an example process involving an unauthorized attempt to remove the immutability of a resource retention rule in accordance with aspects of the present disclosure. As shown in FIG. 3, at (1), an unauthorized user 102B requests to remove the immutability of the resource retention rule. At (2), in response, the resource recovery service 140 initiates a grace period associated with removing the immutability of the resource retention rule. At (3), the unauthorized user 102B requests deletion of the resource retention rule before the grace period expires. At (4), in response, the resource recovery service 140 determines that the resource retention rule is still immutable, and at (5), rejects the requested deletion of the resource retention rule. At (6), the unauthorized user 102B requests deletion of a resource from the resource management service 103. At (7), in response, the resource management service 103 deletes the resource according to the instructions received from the resource recovery service 140 such that the resource is placed in a recoverable state. At (8), after the admin 102A discovers that the malicious deletion of the resource that occurred at (7), the admin 102A requests recovery of the deleted resource. At (9), in response, the resource management service 103 restores the resource from the recoverable state. At (10), after the admin 102A discovers that the malicious attempt to remove the immutability from the resource retention rule that occurred at (1), the admin 102A requests to restore the immutability of the resource retention rule, prior to the grace period expires. At (11), in response, the resource recovery service 140 restores the immutability of the resource retention rule.

Example Routine for Creating an Immutable Resource Retention Rule

FIG. 4 depicts an illustrative routine 400 for creating an immutable retention rule in accordance with aspects of the present disclosure. The routine 400 may be carried out, for example, by the resource recovery service 140 or one or more other components of the cloud provider network 120 described herein. For convenience, some or all of the steps of the routine 400 are described as being performed by the resource recovery service 140. For example, the resource recovery service 140 may include one or more hardware computing devices and non-transitory physical computer storage storing instructions that, when executed by the one or more hardware computing devices, cause the one or more hardware computing devices to perform the steps of the routine 400.

The routine 400 begins at block 402, at which the resource recovery service 140 receives a request to create an immutable retention rule. The request may include one or more parameters usable to determine whether a particular resource matches the immutable retention rule (e.g., tags, resource types, service types, resource sizes, account types, etc.) and/or one or more parameters that define the retention behavior (e.g., retention period). The request may also include a grace period for unlocking the immutable retention rule (e.g., to remove its immutability) and/or any other parameters described herein.

At block 404, the resource recovery service 140 creates the retention rule according to the received request and uses the retention rule to place deleted resources that match the resource rule in a recoverable state according to the parameters of the retention rule (e.g., retention period). Additional details relating to resource retention rules or resource recovery rules are provided in U.S. application Ser. No. 17/449, 629, titled "RESOURCE RECOVERY SERVICE," which is incorporated herein by reference in its entirety."

At block 406, the resource recovery service 140 receives a request to delete or modify the retention rule. For example, the request may be sent by an administrative user who sent the request at block 402, an unauthorized user who has obtained the credentials of the administrative user, another authorized user different from the administrative user who sent the request at block 402, or another unauthorized user who has obtained the credentials of an authorized user different from the administrative user who sent the request at block 402.

At block 408, the resource recovery service 140 determines whether the retention rule is in a locked state. If the resource recovery service 140 determines that the retention rule is in a locked state, the routine 400 proceeds to block 410, where the resource recovery service 140 rejects the request, and returns to block 404 to continue to use and apply the retention rule to deleted resources. If the resource recovery service 140 determines that the retention rule is not in a locked state, the routine 400 proceeds to block 412.

At block 412, the resource recovery service 140 performs the deletion or modification according to the request received at block 406. If the retention rule is deleted, the routine 400 may then end. If the retention rule is modified, the modified rule may continue to be applied to deleted resources.

The routine 400 can include fewer, more, or different blocks than those illustrated in FIG. 4 and/or one or more blocks illustrated in FIG. 4 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Disabling the Immunity of a Resource Retention Rule

FIG. 5 depicts an illustrative routine 500 for disabling the immutability of a retention rule in accordance with aspects of the present disclosure. The routine 500 may be carried out, for example, by the resource recovery service 140 or one or more other components of the cloud provider network 120 described herein. For convenience, some or all of the steps of the routine 500 are described as being performed by the resource recovery service 140. For example, the resource recovery service 140 may include one or more hardware computing devices and non-transitory physical computer storage storing instructions that, when executed by the one or more hardware computing devices, cause the one or more hardware computing devices to perform the steps of the routine 500.

The routine 500 begins at block 502, at which the resource recovery service 140 receives a request to disable the immunity of a retention rule. For example, the request may be sent by an administrative user who created the retention rule, an unauthorized user who has obtained the credentials of the administrative user, another authorized user different from the administrative user who created the retention rule, or another unauthorized user who has obtained the credentials of an authorized user different from the administrative user who created the retention rule.

At block 504, the resource recovery service 140 initiates a grace period associated with disabling the immunity of the retention rule. For example, the request may include any information or metadata associated with the retention rule, such as a retention rule ID and/or a parameter/flag value corresponding to the immutability being disabled.

At block 506, the resource recovery service 140 determines whether a request to restore the immutability of the retention rule has been received. If so, the resource recovery service 140 proceeds to block 508, where the resource recovery service 140 restores the immutability of the retention rule. Otherwise, the resource recovery service 140 proceeds to block 510, where the resource recovery service 140 determines whether the grace period associated with disabling the immunity of the retention rule has expired. If the resource recovery service 140 determines that the grace period has not expired, the routine 500 proceeds to block 512, where the resource recovery service 140 maintains the retention rule in a locked state and reject any requests to delete or modify the retention rule, and the routine 500 further proceeds to block 506. If the resource recovery service 140 determines that the grace period associated with disabling the immunity of the retention rule has expired, the routine 500 proceeds to block 514, where the resource recovery service 140 unlocks the retention rule such that the retention rule is no longer immutable and can be modified or deleted in response to user requests. The routine 500 may then end.

The routine 500 can include fewer, more, or different blocks than those illustrated in FIG. 5 and/or one or more blocks illustrated in FIG. 5 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Deleting a Resource Retention Rule

Figure 6:
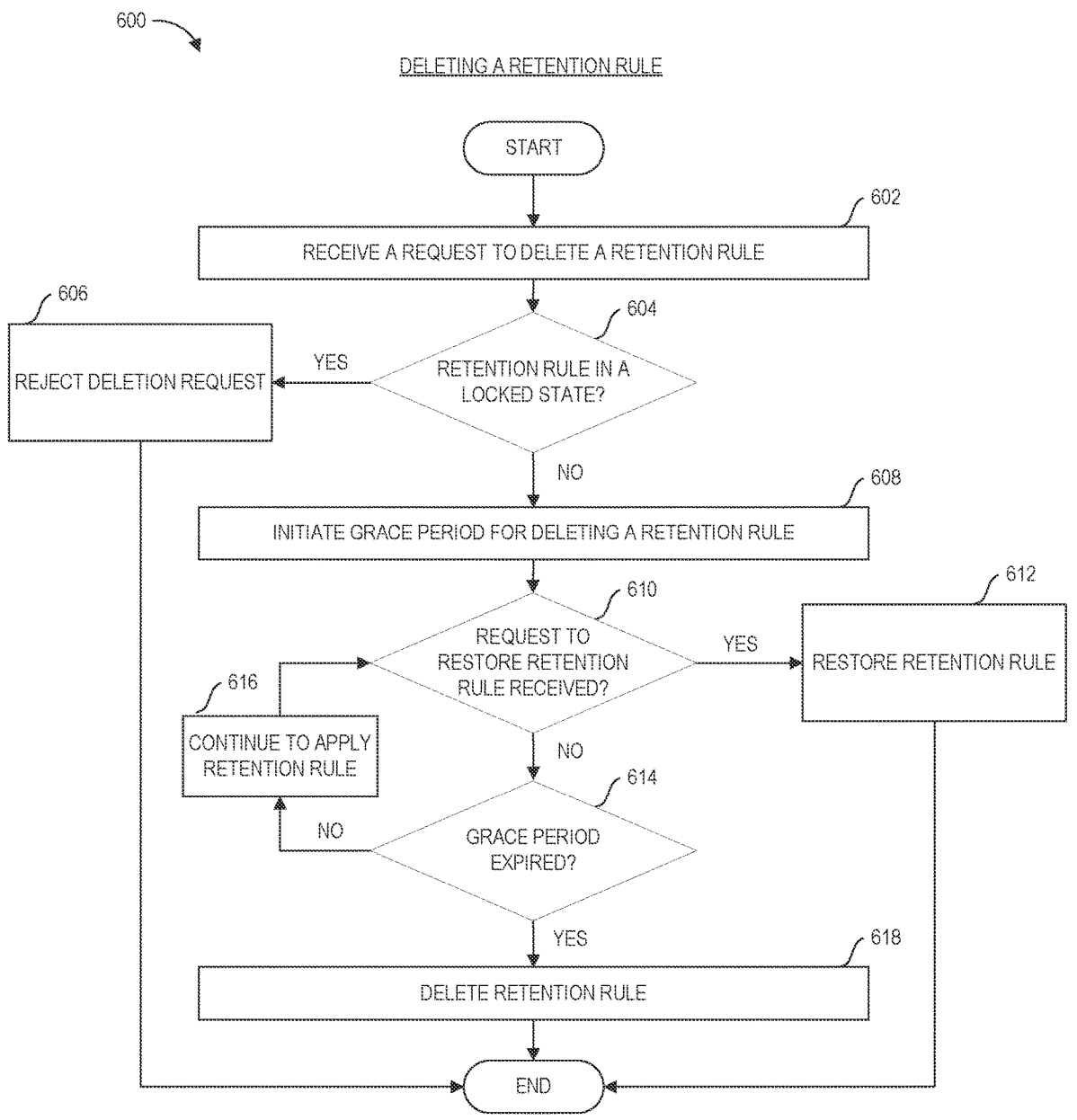
FIG. 6 is a flowchart of an example process for deleting a retention rule in accordance with aspects of the present disclosure.

FIG. 6 depicts an illustrative routine 600 for deleting a retention rule in accordance with aspects of the present disclosure. The routine 600 may be carried out, for example, by the resource recovery service 140 or one or more other components of the cloud provider network 120 described herein. For convenience, some or all of the steps of the routine 600 are described as being performed by the resource recovery service 140. For example, the resource recovery service 140 may include one or more hardware computing devices and non-transitory physical computer storage storing instructions that, when executed by the one or more hardware computing devices, cause the one or more hardware computing devices to perform the steps of the routine 600.

The routine 600 begins at block 602, at which the resource recovery service 140 receives a request to delete a retention rule. For example, the request may be sent by an administrative user who created the retention rule, an unauthorized user who has obtained the credentials of the administrative user, another authorized user different from the administrative user who created the retention rule, or another unauthorized user who has obtained the credentials of an authorized user different from the administrative user who created the retention rule.

At block 604, the resource recovery service 140 determines whether the retention rule is in a locked state. If so, the routine 600 proceeds to block 606, where the resource recovery service 140 rejects the request. Otherwise, the routine proceeds to block 608, where the resource recovery service 140 initiates a grace period for deleting a retention rule.

At block 608, the resource recovery service 140 determines whether a request to restore the retention rule has been received. If so, the routine 600 proceeds to block 612, where the resource recovery service 140 restores the retention rule. Otherwise, the routine 600 proceeds to block 614.

At block 614, the resource recovery service 140 determines whether the grace period for deleting the retention rule has expired. If not, the routine 600 proceeds to block 616, where the resource recovery service 140 continues to apply the retention rule to requests to delete resources, and the routine further returns to block 610. If the resource recovery service 140 determines that the grace period has expired, the routine 600 proceeds to block 618.

At block 618, the resource recovery service 140 deletes the retention rule. The routine 600 may then end. Although FIG. 6 illustrates an example in which a grace period is used to place a deleted retention rule in a recoverable state, in other embodiments, if a retention rule is not in a locked state and a request to delete the retention rule is received, the retention rule is deleted immediately without being placed in a recoverable state (e.g., permanently).

The routine 600 can include fewer, more, or different blocks than those illustrated in FIG. 6 and/or one or more blocks illustrated in FIG. 6 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Computing System

Figure 7:
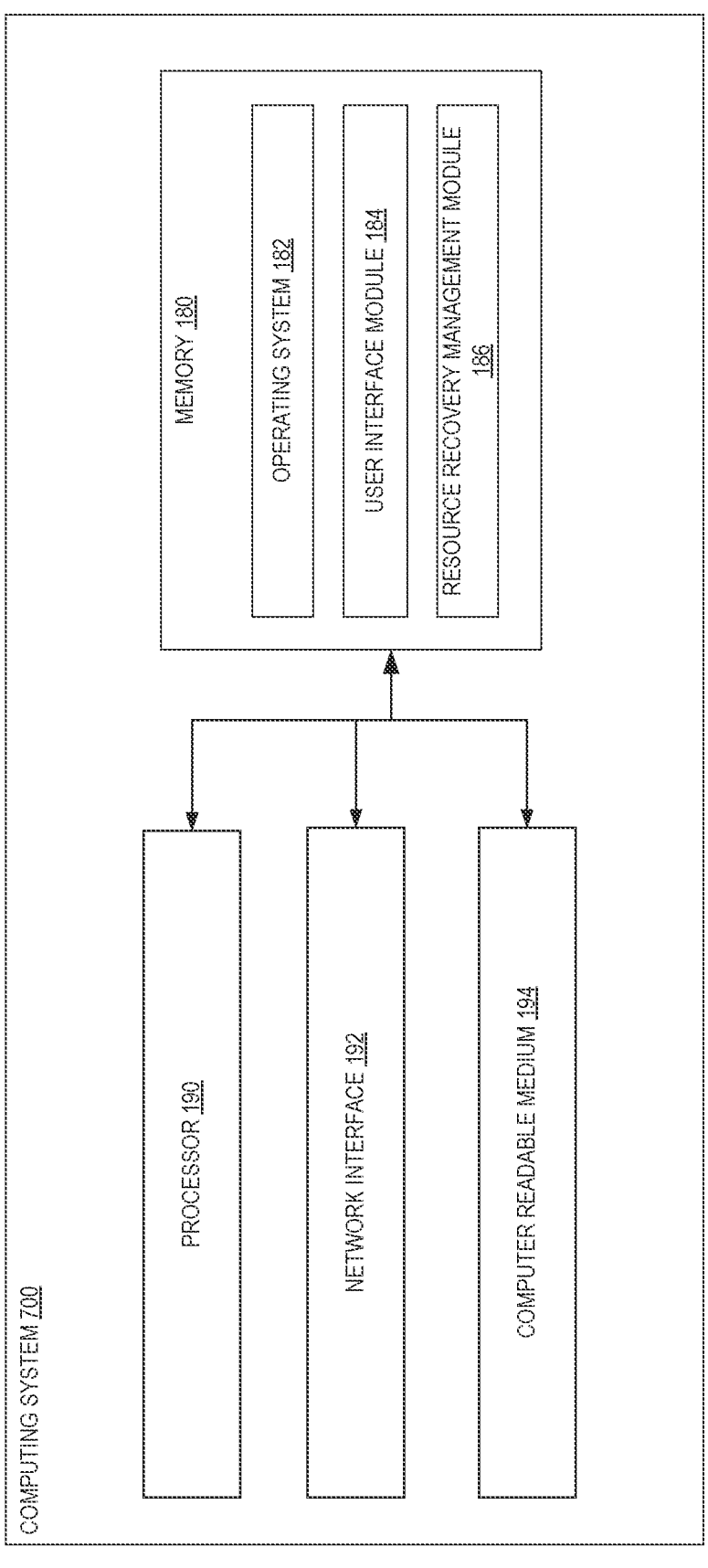
FIG. 7 depicts a general architecture of a computing device or system usable to implement one or more components descried herein, in accordance with aspects of the present disclosure.

FIG. 7 depicts an example architecture of a computing system 700 that can be used to perform one or more of the techniques described herein or illustrated in FIGS. 1-6. The general architecture of the computing system 700 depicted in FIG. 7 includes an arrangement of computer hardware and software modules that may be used to implement one or more aspects of the present disclosure. The computing system 700 may include many more (or fewer) elements than those shown in FIG. 7. It is not necessary, however, that all of these elements be shown in order to provide an enabling disclosure. For example, the computing system 700 may be used to implement one or more of the elements described herein, including the resource recovery service 140, block store service 105, object storage service 110, object storage service 110, compute service 115, and/or the user computing devices 102.

As illustrated, the computing system 700 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 182 that provides computer program instructions for use by the processor 190 in the general administration and operation of the computing system 700. The memory 180 may further include computer program instructions and other information for implementing one or more aspects of the present disclosure. For example, in one embodiment, the memory 180 includes a user interface module 184 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 184, the memory 180 may include a resource recovery management module 186 that may be executed by the processor 190. In one embodiment, the resource recovery management module 186 implements various aspects of the present disclosure, e.g., those illustrated in FIGS. 1-6 or described with reference to FIGS. 1-6.

Although a single processor, a single network interface, a single computer-readable medium, and a single memory are illustrated in the example of FIG. 7, in other implementations, the computing system 700 can have a multiple of one or more of these components (e.g., two or more processors and/or two or more memories).

Example Implementations (EIs)

Some enumerated example implementations (EIs) are provided in this section, without limitation.

EI 1: A cloud provider system comprising: a plurality of resource management services each comprising computer hardware and configured to manage creation and deletion of respective resource types of user resources; and a resource recovery service comprising computer hardware and in network communication with the plurality of resource management services, wherein the network resource recovery service is configured to at least: receive, from an administrative user of the resource recovery service, a first resource retention rule that specifies to place resources of a resource type in a recoverable state upon deletion and further specifies a resource retention period for which resources of the resource type are to be kept in the recoverable state before permanent deletion; configure the first resource retention rule such that the first resource retention rule is immutable; receive, from the administrative user, a request to delete the first resource retention rule; in response to determining that the first resource retention rule is immutable, reject the request to delete the first resource retention rule; receive a request to delete a particular resource of the resource type from a resource management service of the plurality of resource management services; determine that the particular resource matches the first resource retention rule specified by the administrative user; and output, to the resource management service, an instruction to place the particular resource in a recovery bin.

EI 2: The cloud provider system of EI 1, wherein the resource recovery service is further configured to: receive, from the administrative user, a request to delete a second resource retention rule; and in response to determining that the second resource retention rule is not immutable, cause the second resource retention rule to be deleted such that resources of a particular resource type specified by the second resource retention rule would no longer be kept in a recoverable state upon deletion.

EI 3: The cloud provider system of EI 2, wherein the resource recovery service is further configured to: receive, from the administrative user, a request to remove immutability from the first resource retention rule; subsequent to receiving the request to remove immutability from the first resource retention rule, receive, from the administrative user, a request to delete the first resource retention rule such that resources of the resource type specified by the first resource retention rule would no longer be kept in the recoverable state upon deletion; and in response to determining that a grace period associated with removing immutability from the first resource retention rule has not yet expired, reject the request to delete the first resource retention rule.

EI 4: The cloud provider system of EI 1, wherein the plurality of resource management services comprises one or more of a database service configured to create or delete database tables, a block store service configured to create or delete data storage volumes, a snapshot service configured to create or delete snapshots of data storage volumes, an object storage service configured to create or delete data storage buckets, or a compute service configured to create or delete compute instances.

EI 5: A computer-implemented method comprising: receiving a request to create a first resource retention rule configured to cause resources satisfying a particular condition to be placed in a recoverable state upon deletion for a resource retention period before permanent deletion; configuring the first resource retention rule for a resource recovery service such that the first resource retention rule is unable to be deleted or modified; receiving a request to delete the first resource retention rule; and in response to determining that the first resource retention rule is in a locked state, rejecting the request to delete the first resource retention rule.

EI 6: The computer-implemented method of EI 5, further comprising: receiving a request to delete a particular resource satisfying the condition from a resource management service in networked communication with the resource recovery service; determining that the particular resource matches the first resource retention rule managed by the resource recovery service; and outputting, to the resource management service, an instruction to place the particular resource in a recoverable state.

EI 7: The computer-implemented method of EI 5, further comprising: receiving a request to delete a second resource retention rule; and in response to determining that the second resource retention rule is not in a locked state, deleting the second resource retention rule such that resources satisfying a condition specified by the second resource retention rule would no longer be kept in a recoverable state upon deletion.

EI 8: The computer-implemented method of EI 5, further comprising: subsequent to receiving a request to delete the first resource retention rule, receiving a request to delete a particular resource from a resource management service in networked communication with the resource recovery service; determining that the particular resource satisfies the condition specified by the first resource retention rule managed by the resource recovery service; and outputting, to the resource management service, an instruction to place the particular resource in a recoverable state.

EI 9: The computer-implemented method of EI 5, wherein the request to create the first resource retention rule and the request to delete the first resource retention rule are associated with the same set of administrative user credentials.

EI 10: The computer-implemented method of EI 5, wherein the request to create the first resource retention rule and the request to delete the first resource retention rule are each associated with a different set of user credentials.

EI 11: The computer-implemented method of EI 5, further comprising: receiving a request to remove immutability from the first resource retention rule; subsequent to receiving the request to remove immutability from the first resource retention rule, receiving a request to delete the first resource retention rule such that resources satisfying the condition specified by the first resource retention rule would no longer be kept in the recoverable state upon deletion; and in response to determining that a grace period associated with removing immutability from the first resource retention rule has not yet expired, rejecting the request to delete the first resource retention rule.

EI 12: The computer-implemented method of EI 11, further comprising allowing the grace period associated with removing immutability from the first resource retention rule to elapse prior to removing immutability from the first resource retention rule.

EI 13: A non-transitory computer-readable medium storing instructions that, when executed by a computing system within a cloud provider network, cause the computing system to perform operations comprising: receiving a request to create a first resource retention rule configured to cause resources satisfying a particular condition to be placed in a recoverable state upon deletion for a resource retention period before permanent deletion; configuring the first resource retention rule for a resource recovery service such that the first resource retention rule is unable to be deleted or modified; receiving a request to delete the first resource retention rule; and in response to determining that the first resource retention rule is in a locked state, rejecting the request to delete the first resource retention rule.

EI 14: The non-transitory computer-readable medium of EI 13, storing further instructions that, when executed by the computing system, cause the computing system to perform operations comprising: receiving a request to delete a particular resource satisfying the condition from a resource management service in networked communication with the resource recovery service; determining that the particular resource matches the first resource retention rule managed by the resource recovery service; and outputting, to the resource management service, an instruction to place the particular resource in a recoverable state.

EI 15: The non-transitory computer-readable medium of EI 13, storing further instructions that, when executed by the computing system, cause the computing system to perform operations comprising: receiving a request to delete a second resource retention rule; and in response to determining that the second resource retention rule is not in a locked state, deleting the second resource retention rule such that resources satisfying a condition specified by the second resource retention rule would no longer be kept in a recoverable state upon deletion.

EI 16: The non-transitory computer-readable medium of EI 13, storing further instructions that, when executed by the computing system, cause the computing system to perform operations comprising: subsequent to receiving a request to delete the first resource retention rule, receiving a request to delete a particular resource from a resource management service in networked communication with the resource recovery service; determining that the particular resource satisfies the condition specified by the first resource retention rule managed by the resource recovery service; and outputting, to the resource management service, an instruction to place the particular resource in a recoverable state.

EI 17: The non-transitory computer-readable medium of EI 13, wherein the request to create the first resource retention rule and the request to delete the first resource retention rule are associated with the same set of administrative user credentials.

EI 18: The non-transitory computer-readable medium of EI 13, wherein the request to create the first resource retention rule and the request to delete the first resource retention rule are each associated with a different set of user credentials.

EI 19: The non-transitory computer-readable medium of EI 13, storing further instructions that, when executed by the computing system, cause the computing system to perform operations comprising: receiving a request to remove immutability from the first resource retention rule; subsequent to receiving the request to remove immutability from the first resource retention rule, receiving a request to delete the first resource retention rule such that resources satisfying the condition specified by the first resource retention rule would no longer be kept in the recoverable state upon deletion; and in response to determining that a grace period associated with removing immutability from the first resource retention rule has not yet expired, rejecting the request to delete the first resource retention rule.

EI 20: The non-transitory computer-readable medium of EI 19, storing further instructions that, when executed by the computing system, cause the computing system to perform operations comprising allowing the grace period associated with removing immutability from the first resource retention rule to elapse prior to removing immutability from the first resource retention rule.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, micro-controller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system comprising:
a plurality of resource management services each comprising computer hardware and configured to manage creation and deletion of respective resource types of user resources; and
a resource recovery service comprising computer hardware and in network communication with the plurality of resource management services, wherein the network resource recovery service is configured to at least:
receive, from an administrative user of the resource recovery service, a first resource retention rule that specifies to place resources of a resource type in a recoverable state upon deletion and further specifies a resource retention period for which resources of the resource type are to be kept in the recoverable state before permanent deletion;
configure the first resource retention rule such that the first resource retention rule is immutable;
receive, from the administrative user, a first request to delete the first resource retention rule;
in response to determining that the first resource retention rule is immutable, reject the first request to delete the first resource retention rule;

receive a request to delete a particular resource of the resource type from a resource management service of the plurality of resource management services;
determine that the particular resource matches the first resource retention rule specified by the administrative user; and
output, to the resource management service, an instruction to place the particular resource in a recovery bin.

2. The cloud provider system of claim 1, wherein the resource recovery service is further configured to:
receive, from the administrative user, a request to delete a second resource retention rule; and
in response to determining that the second resource retention rule is not immutable, cause the second resource retention rule to be deleted such that resources of a particular resource type specified by the second resource retention rule would no longer be kept in a recoverable state upon deletion.

3. The cloud provider system of claim 2, wherein the resource recovery service is further configured to:
receive, from the administrative user, a request to remove immutability from the first resource retention rule;
subsequent to receiving the request to remove immutability from the first resource retention rule, receive, from the administrative user, a second request to delete the first resource retention rule such that resources of the resource type specified by the first resource retention rule would no longer be kept in the recoverable state upon deletion; and
in response to determining that a grace period associated with removing immutability from the first resource retention rule has not yet expired, reject the second request to delete the first resource retention rule.

4. The cloud provider system of claim 1, wherein the plurality of resource management services comprises one or more of a database service configured to create or delete database tables, a block store service configured to create or delete data storage volumes, a snapshot service configured to create or delete snapshots of data storage volumes, an object storage service configured to create or delete data storage buckets, or a compute service configured to create or delete compute instances.

5. A computer-implemented method comprising:
receiving a request to create a first resource retention rule configured to cause resources satisfying a condition to be placed in a recoverable state upon deletion for a resource retention period before permanent deletion;
configuring the first resource retention rule for a resource recovery service such that the first resource retention rule is unable to be deleted or modified;
receiving a first request to delete the first resource retention rule; and
in response to determining that the first resource retention rule is in a locked state, rejecting the first request to delete the first resource retention rule.

6. The computer-implemented method of claim 5, further comprising:
receiving a request to delete a particular resource satisfying the condition from a resource management service in networked communication with the resource recovery service;
determining that the particular resource matches the first resource retention rule managed by the resource recovery service; and
outputting, to the resource management service, an instruction to place the particular resource in a recoverable state.

7. The computer-implemented method of claim 5, further comprising:

receiving a request to delete a second resource retention rule; and in response to determining that the second resource retention rule is not in a locked state, deleting the second resource retention rule such that resources satisfying a condition specified by the second resource retention rule would no longer be kept in a recoverable state upon deletion.

8. The computer-implemented method of claim 5, further comprising:

subsequent to receiving the first request to delete the first resource retention rule, receiving a request to delete a particular resource from a resource management service in networked communication with the resource recovery service;

determining that the particular resource satisfies the condition specified by the first resource retention rule managed by the resource recovery service; and outputting, to the resource management service, an instruction to place the particular resource in a recoverable state.

9. The computer-implemented method of claim 5, wherein the request to create the first resource retention rule and the request to delete the first resource retention rule are associated with the same set of administrative user credentials.

10. The computer-implemented method of claim 5, wherein the request to create the first resource retention rule and the request to delete the first resource retention rule are each associated with a different set of user credentials.

11. The computer-implemented method of claim 5, further comprising:

receiving a request to remove immutability from the first resource retention rule;

subsequent to receiving the request to remove immutability from the first resource retention rule, receiving a second request to delete the first resource retention rule such that resources satisfying the condition specified by the first resource retention rule would no longer be kept in the recoverable state upon deletion; and in response to determining that a grace period associated with removing immutability from the first resource retention rule has not yet expired, rejecting the second request to delete the first resource retention rule.

12. The computer-implemented method of claim 11, further comprising allowing the grace period associated with removing immutability from the first resource retention rule to elapse prior to removing immutability from the first resource retention rule.

13. A non-transitory computer-readable medium storing instructions that, when executed by a computing system within a cloud provider network, cause the computing system to perform operations comprising:

receiving a request to create a first resource retention rule configured to cause resources satisfying a condition to be placed in a recoverable state upon deletion for a resource retention period before permanent deletion;

configuring the first resource retention rule for a resource recovery service such that the first resource retention rule is unable to be deleted or modified;

receiving a first request to delete the first resource retention rule; and in response to determining that the first resource retention rule is in a locked state, rejecting the first request to delete the first resource retention rule.

14. The non-transitory computer-readable medium of claim 13, storing further instructions that, when executed by the computing system, cause the computing system to perform operations comprising:

receiving a request to delete a particular resource satisfying the condition from a resource management service in networked communication with the resource recovery service;

determining that the particular resource matches the first resource retention rule managed by the resource recovery service; and outputting, to the resource management service, an instruction to place the particular resource in a recoverable state.

15. The non-transitory computer-readable medium of claim 13, storing further instructions that, when executed by the computing system, cause the computing system to perform operations comprising:

receiving a request to delete a second resource retention rule; and in response to determining that the second resource retention rule is not in a locked state, deleting the second resource retention rule such that resources satisfying a condition specified by the second resource retention rule would no longer be kept in a recoverable state upon deletion.

16. The non-transitory computer-readable medium of claim 13, storing further instructions that, when executed by the computing system, cause the computing system to perform operations comprising:

subsequent to receiving the first request to delete the first resource retention rule, receiving a request to delete a particular resource from a resource management service in networked communication with the resource recovery service;

determining that the particular resource satisfies the condition specified by the first resource retention rule managed by the resource recovery service; and outputting, to the resource management service, an instruction to place the particular resource in a recoverable state.

17. The non-transitory computer-readable medium of claim 13, wherein the request to create the first resource retention rule and the first request to delete the first resource retention rule are associated with the same set of administrative user credentials.

18. The non-transitory computer-readable medium of claim 13, wherein the request to create the first resource retention rule and the first request to delete the first resource retention rule are each associated with a different set of user credentials.

19. The non-transitory computer-readable medium of claim 13, storing further instructions that, when executed by the computing system, cause the computing system to perform operations comprising:

receiving a request to remove immutability from the first resource retention rule;

subsequent to receiving the request to remove immutability from the first resource retention rule, receiving a second request to delete the first resource retention rule such that resources satisfying the condition specified by the first resource retention rule would no longer be kept in the recoverable state upon deletion; and in response to determining that a grace period associated with removing immutability from the first resource retention rule has not yet expired, rejecting the second request to delete the first resource retention rule.

20. The non-transitory computer-readable medium of claim 19, storing further instructions that, when executed by the computing system, cause the computing system to perform operations comprising allowing the grace period associated with removing immutability from the first resource retention rule to elapse prior to removing immutability from the first resource retention rule.

\* \* \* \* \*